(12) United States Patent
Ruiz Aldama et al.

(10) Patent No.: US 10,330,080 B2
(45) Date of Patent: Jun. 25, 2019

(54) WIND TURBINE CONTROL METHOD AND ASSOCIATED WIND TURBINE

(71) Applicant: Acciona Windpower, S.A., Sarriguren, Navarra (ES)

(72) Inventors: Alfonso Ruiz Aldama, Navarra (ES); Diego Otamendi Claramunt, Navarra (ES); Teresa Arlaban Gabeiras, Navarra (ES); Jose Miguel Garcia Sayes, Navarra (ES); Miguel Nunez Polo, Navarra (ES)

(73) Assignee: ACCIONA WINDPOWER, S.A. (ES)

( * ) Notice: Subject to any disclaimer, the term of this patent is extended or adjusted under 35 U.S.C. 154(b) by 323 days.

(21) Appl. No.: 15/387,130

(22) Filed: Dec. 21, 2016

(65) Prior Publication Data

US 2017/0184073 A1 Jun. 29, 2017

(30) Foreign Application Priority Data

Dec. 28, 2015 (EP) .................................... 15382666

(51) Int. Cl.
| | |
|---|---|
| *F03D 7/02* | (2006.01) |
| *F03D 17/00* | (2016.01) |
| *F03D 7/04* | (2006.01) |
| *F03D 9/25* | (2016.01) |

(52) U.S. Cl.
CPC .......... *F03D 7/0204* (2013.01); *F03D 7/042* (2013.01); *F03D 9/25* (2016.05); *F03D 17/00* (2016.05); *F05B 2240/221* (2013.01); *F05B 2270/101* (2013.01); *F05B 2270/20* (2013.01); *F05B 2270/321* (2013.01); *F05B 2270/329* (2013.01); *F05B 2270/802* (2013.01); *Y02E 10/723* (2013.01); *Y02P 70/523* (2015.11)

(58) Field of Classification Search
CPC .......... F03D 7/0204; F03D 9/25; F03D 17/00; F03D 7/042; Y02E 10/723; Y02P 70/523; F05B 2270/802; F05B 2270/329; F05B 2270/321; F05B 2240/221; F05B 2270/101; F05B 2270/20
See application file for complete search history.

(56) References Cited

U.S. PATENT DOCUMENTS

| | | | |
|---|---|---|---|
| 7,952,215 B2* | 5/2011 | Hayashi | F03D 7/0204 290/44 |
| 8,476,780 B2 | 7/2013 | Hashimoto et al. | |
| 2013/0125632 A1* | 5/2013 | Bjerge | F03D 7/00 73/112.01 |
| 2014/0003939 A1* | 1/2014 | Adams | F03D 7/0224 416/1 |

(Continued)

FOREIGN PATENT DOCUMENTS

| | | |
|---|---|---|
| EP | 2154362 A1 | 2/2010 |
| EP | 1809899 B1 | 12/2012 |

*Primary Examiner* — Charles G Freay
(74) *Attorney, Agent, or Firm* — Hayes Soloway PC

(57) ABSTRACT

The present invention relates to a wind turbine control method that makes it possible to detect misalignments in said wind turbine with respect to the wind direction, wherein once these situations are detected, the control method of the present invention makes it possible to perform an automatic correction of the control parameters and to return the wind turbine to its optimal operating point, together with the associated wind turbine.

24 Claims, 3 Drawing Sheets

(56) References Cited

U.S. PATENT DOCUMENTS

| | | | |
|---|---|---|---|
| 2014/0116106 A1* | 5/2014 | Pelletier | F03D 17/00 73/1.27 |
| 2014/0348650 A1* | 11/2014 | Hansen | F03D 7/0204 416/1 |
| 2015/0176568 A1* | 6/2015 | Laborda Rubio | F03D 7/044 416/1 |

* cited by examiner

WIND TURBINE CONTROL METHOD AND ASSOCIATED WIND TURBINE

OBJECT OF THE INVENTION

The present invention relates to a wind turbine control method that makes it possible to detect the misalignments of said with turbine with respect to the wind direction, and also to the associated wind turbine.

Furthermore, after detecting these situations, the control method of the present invention makes it possible to perform an automatic correction of the control parameters and to return the wind turbine to its optimal operating point.

BACKGROUND OF THE INVENTION

Wind turbines are provided with an orientation system around a vertical axis, which allows the nacelle to be aligned in the wind direction so as to maximise the harvesting of energy from the wind. This mechanism, called the yaw system is commanded by a wind vane located on the roof of the nacelle downwind of the rotor.

There are different factors that can introduce an error in the alignment of the nacelle, among them:
  distortion of the flow in the wind vane induced by the rotor;
  errors in the assembly of the wind vane.

An error in the alignment of the nacelle in relation to the wind direction entails a loss of energy production and an increase in loads on the wind turbine, which are greater, the greater misalignment.

With the goal to minimising the effect of some of the factors that affect orientation, it is usual to introduce a parameter called the yaw offset which is added to the signal provided by the wind vane.

As a first approach, it is considered the value of this parameter to be a constant and apply equally to all the wind turbines belonging to the same family.

It is known in the state of the art patent document EP1809899B1 relating to a method for the automatic correction of control parameters for the orientation of a wind turbine, which comprises the following steps:
  a step of measurement of the speed and wind direction, in addition to measurement of an electromagnetic property,
  a step of obtainment of an efficiency measurement based on the measurement of the electromagnetic property and wind speed, this efficiency measurement being an indicator of how much the wind turbine generates in given conditions,
  a step of classification into positive and negative wind direction to obtain a first mean value of the efficiency measurement for which the wind direction is positive and to obtain a second mean value of the efficiency measurement for which the wind direction is negative,
  a step of determination of the difference between the first and second mean efficiency value, and
  a step of issuance to the control system in charge of the orientation of a calibration value corresponding to the difference.

This method indicates that there may be a position error and issues a correction value. However, due to the way of obtaining it, based solely on the difference between the efficiency values, it provides a not very accurate value and is very sensitive to the uncertainties associated with measurements.

Patent document U.S. Pat. No. 8,476,780 is also known, relating to a method for estimating the wind direction in a wind turbine which comprises the following steps:
  a step of detection of a main wind direction,
  a step of assuming an actual wind direction by assuming an offset value which is a deviation between the main wind direction and the actual wind direction, at a predetermined wind speed,
  a step of calculating an average generator output power for a predetermined period of time in the actual wind direction which has been assumed,
  a step of estimating the actual wind direction by approximating the average generator output power with respect to the wind direction offset value which has been assumed to a quadratic curve and estimating the wind direction offset value at the time when the average generator output power is the maximum in the quadratic curve which has been approximated to be an actual offset value.

However, this solution is not very robust and is very sensitive to errors or uncertainties associated with measurements for the following reasons:

Said method carries out the calculation of the correction value in real time, detecting the main wind direction and assuming offset values (−10°, 0° and 10° in the example) to calculate corresponding wind directions according to said offset values. As a consequence of assuming these offset values, misalignments are being forced in the wind turbine. This has the drawback of production losses and increase in loads on the wind turbine due to the fact that a specific campaign has to be carried out in order to force said misalignments.

Subsequently, it approximates the points by least squares fit .Ito a quadratic function, calculating the maximum thereof and determining the correction value on the basis of said maximum. This quadratic regression presents the following drawbacks:
  On performing the quadratic regression, it is possible that depending on the values obtained, the quadratic function or parabola does not have a maximum, meaning that the step of estimation of the method above would have as a result an error value. This situation is due to the fact that owing to uncertainties in the measurement, the points are not exactly in their theoretical position but rather may have variations around that position. These variations, although of a small magnitude, may distort the results and even generate an error in the estimation.
  On performing the quadratic regression, it can be that, depending on the values obtained, the quadratic function or parabola does have a maximum, but it may be distant from the real wind direction, meaning that the correction value would be very high, close to 90°, which is very probably not the correct correction value.

The object of the present invention is a control method to detect situations in which the wind turbine is not working at its optimal operating point due to a misalignment of said wind turbine with respect to the wind direction, overcoming the aforementioned drawbacks in the state of the art.

Also, once these situations have been detected, the control method of the present invention makes it possible to carry out an automatic correction of the control parameters and to return the wind turbine to its optimal operating point.

DESCRIPTION OF THE INVENTION

The present invention relates to a wind turbine control method that makes it possible to detect misalignments of said wind turbine with respect to the wind direction, the wind turbine comprising:

a nacelle that comprises a longitudinal direction, and
an orientation system,
wherein the method comprises the following steps:
a step of gathering of:
values indicative of wind direction with respect to the longitudinal direction of the nacelle, and
values indicative of efficiency of the wind turbine corresponding to each value indicative of wind direction,
a step of calculation of a correction value of the orientation system based on the values indicative of wind direction and the values indicative of efficiency of the wind turbine, and
a step of correction of the orientation of the nacelle based on the correction value of the orientation system,
wherein the step of calculation of the correction value of the orientation system comprises in turn the following sub-steps:
a sub-step of calculation of fitting parameters to a predetermined function, for the adjustment of the values indicative of wind direction and the values indicative of efficiency of the wind turbine to the predetermined function, and
a sub-step of calculation of the correction value of the orientation system based on at least one of the fitting parameters calculated in the preceding sub-step.

In this way, by means of the sub-step of calculation of the parameters of adjustment to the predetermined function, for the adjustment of the values indicative of the wind direction and the values indicative of the efficiency of the wind turbine to the predetermined function, there is no drawback of having to approximate to a function, but rather given that the function is already predetermined and that what is done is to adjust the values indicative of the wind direction and the values indicative of the efficiency of the wind turbine to said function, the method is less sensitive to errors or uncertainties in the measurements.

Preferably, the predetermined function is a function that relates the efficiency loss of the wind turbine to the wind direction with respect to the longitudinal direction of the nacelle. This function can be calculated theoretically by means of analytical calculation or simulation, or empirically.

Preferably, the fitting parameters to the predetermined function of the values indicative of wind direction and of the values indicative of efficiency of the wind turbine of the sub-step of calculation of the fitting parameters are an offset "a" applied to the values indicative of wind direction and an offset "b" applied to the values indicative of efficiency of the wind turbine which provide an adjustment to the predetermined function. In the sub-step of calculation of the correction value of the orientation system according to at least one of the fitting parameters, the correction value of the orientation system is calculated according to the offset "a" applied to the values indicative of wind direction.

Optionally, the step of correction of the orientation of the nacelle is performed once the correction value of the orientation system is higher than a first threshold. In this way, frequent and unnecessary changes in the control parameters are avoided, as correction values below a threshold will have no significant repercussion on either production or loads.

Optionally, during the step of obtaining the values indicative of wind direction and the values indicative of efficiency of the wind turbine, the control system of the wind turbine allows a range of misalignment of the longitudinal direction of the nacelle with respect to the wind direction that is greater than the range of misalignment allowed outside of the step of gathering of the indicative values. In this way, by temporarily allowing a greater range of misalignment, or to state it in other words, greater orientation errors of the nacelle with respect to the wind direction, greater information is obtained to carry out the calculation of the correction value of the orientation system, given that it is possible to analyse a greater range of misalignments of the nacelle and to determine the correction value more accurately, especially when the latter is outside the usual range of misalignments.

The invention also relates to a wind turbine which comprises:
a nacelle that comprises a longitudinal direction,
an orientation system,
means for gathering:
values indicative of wind direction with respect to the longitudinal direction of the nacelle, and
values indicative of efficiency of the wind turbine corresponding to each value indicative of wind direction,
means for calculating a correction value of the orientation system according to values indicative of wind direction and values indicative of efficiency of the wind turbine, and
means for correcting the orientation of nacelle according to the correction value of the orientation system,
wherein the means for calculating the correction value of the orientation system comprise in turn:
means for calculating fitting parameters to a predetermined function of the values indicative of wind direction and of the values indicative of efficiency of the wind turbine,
wherein the means for calculating the correction value of the orientation system calculate the correction value of the orientation system according to at least one of the fitting parameters.

PREFERRED EMBODIMENT OF THE INVENTION

Next, a detailed description follows of the wind turbine control method of the present invention wherein the wind turbine comprises:
  a nacelle that comprises a longitudinal direction, and
  an orientation system,
wherein the method comprises the following steps:
  a step of gathering:
    values indicative of wind direction (1) with respect to the longitudinal direction of the nacelle, and
    values indicative of efficiency (2) of the wind turbine corresponding to each value indicative of wind direction (1),
  a step of calculation of a correction value of the orientation system according to the values indicative of wind direction (1) and values indicative of efficiency (2) of the wind turbine, and
  a step of correction of the orientation of the nacelle according to the correction value of the orientation system,
wherein the step of calculation of the correction value of the orientation system comprises in turn the following sub-steps:
  a sub-step of calculation of fitting parameters to a predetermined function (3), for the adjustment of the values indicative of wind direction (1) and of the values indicative of efficiency (2) of the wind turbine to the predetermined function (3), and
  a sub-step of calculation of the correction value of the orientation system according to at least one of the fitting parameters calculated in the preceding sub-step.

Figure 1:
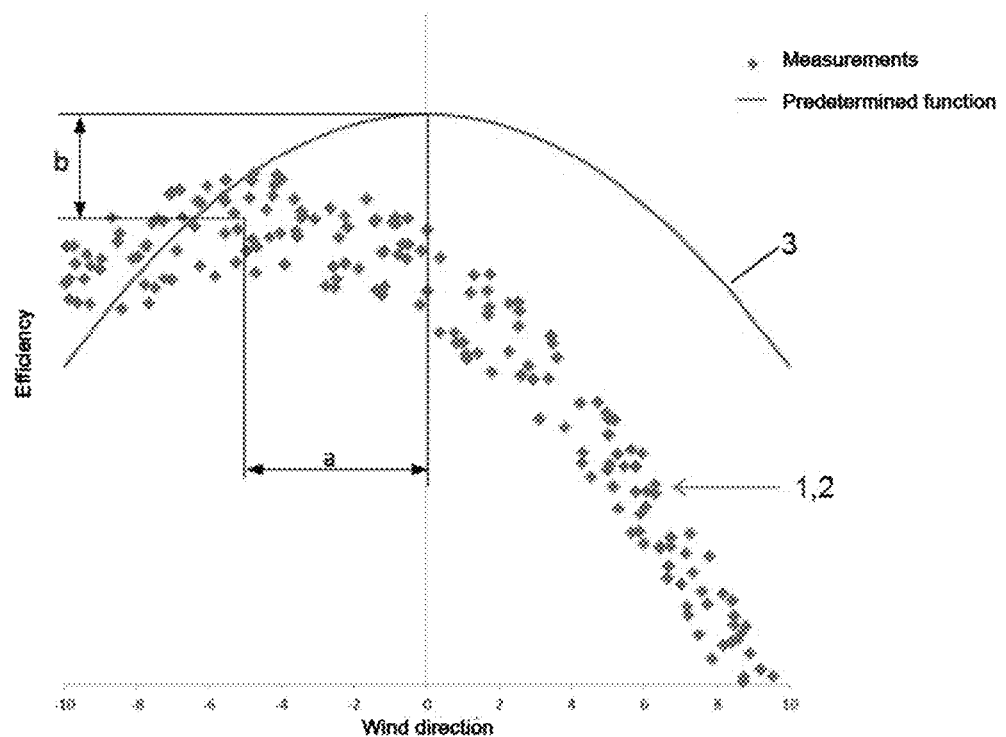
FIG. 1 shows a cloud of dots that represents measurements of the wind direction with respect to the longitudinal direction of the nacelle, and measurements of the efficiency of the wind turbine corresponding to each value indicative of the wind direction, in addition to the predetermined function. In this example of embodiment, the values indicative of the wind direction and of the efficiency of the wind turbine correspond to the measurements of wind direction and the measurements of efficiency of the wind turbine respectively. Also shown are the parameters of adjustment (offset "a" and offset "b"), which provide the best adjustment of the cloud of points of values indicative of the wind direction and efficiency of the wind turbine to the predetermined function.
Figure 2:
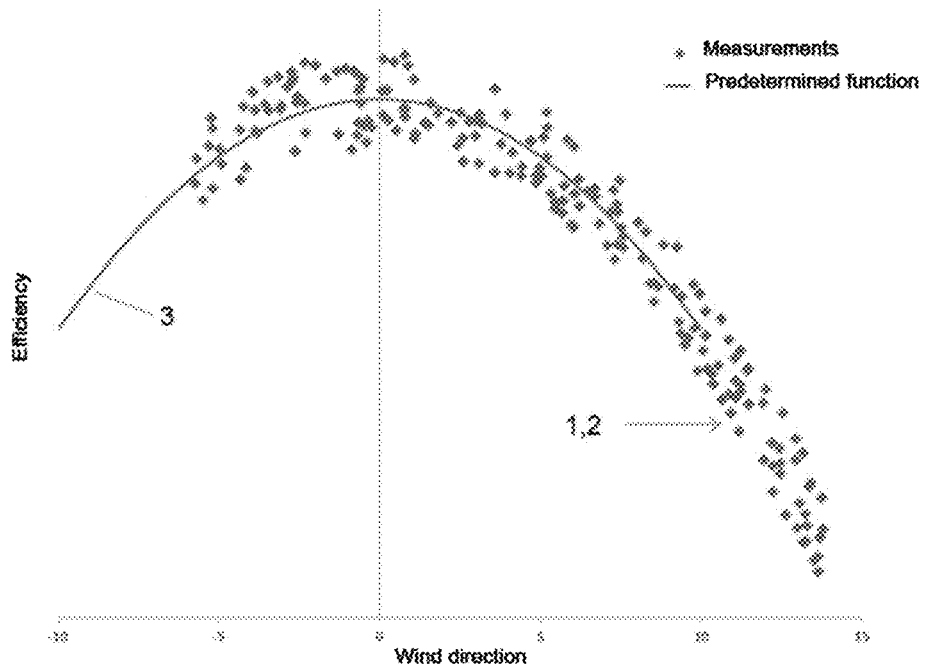
FIG. 2 shows the cloud of points shown in FIG. 1 once the adjustment of the values indicative of direction and of the values indicative of the efficiency to the predetermined function has been made.

Preferably, the fitting parameters to the predetermined function (3) of the values indicative of wind direction (1) and of the values indicative of efficiency (2) of the wind turbine of the sub-step of calculation of the fitting parameters are an offset "a" applied to the values indicative of wind direction (1) and an offset "b" applied to the values indicative of efficiency (2) of the wind turbine which provide an adjustment to the predetermined function (3). In this case, in the sub-step of calculation of the correction value of the orientation system according to at least one of the fitting parameters, the correction value of the orientation system is calculated according to the offset "a" of the signal of wind direction with respect to the longitudinal direction of the nacelle, as observed in FIGS. 1 and 2. Preferably, the correction value of the orientation system is the offset "a".

The values indicative of wind direction (1) and the values indicative of efficiency (2) of the wind turbine can be obtained, respectively, from measurements of wind direction with respect to the longitudinal direction of the nacelle and measurements of efficiency of the wind turbine corresponding to each measurement of wind direction.

In a first example of embodiment, the values indicative of wind direction (1) and the values indicative of efficiency (2) of the wind turbine are respectively measurements of wind direction with respect to the longitudinal direction of the nacelle and measurements of efficiency of the wind turbine corresponding to each measurement of wind direction.

In a second example of embodiment, the step of gathering the values indicative of wind direction (1) and the values indicative of efficiency (2) of the wind turbine can additionally comprise a sub-step of classification of the measurements of efficiency of the wind turbine in at least two groups (4), preferably three groups (4), according to the corresponding measurements of wind direction, wherein the values indicative of efficiency (2) of the wind turbine obtained in the step of gathering the values indicative of wind direction (1) and efficiency (2) of the wind turbine are a value indicative of efficiency (2') of the wind turbine for each group (4) obtained from the measurements of efficiency of the wind turbine of each group (4).

Figure 3:
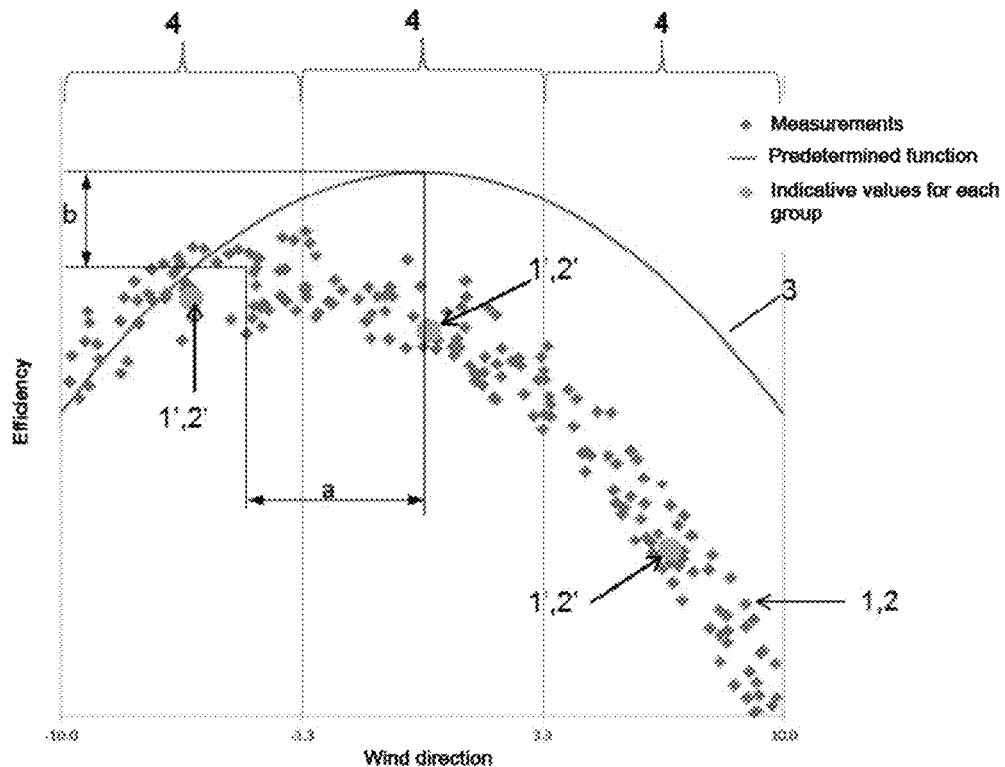
FIG. 3 shows another example of alternative embodiment to the one shown in FIGS. 1 and 2 wherein a sub-step of classification of the measurements of efficiency of the wind turbine and a sub-step of classification of the measurements of wind direction has been applied to the cloud of dots of FIG. 1 in three groups, wherein the values indicative of efficiency and wind direction are a value indicative of efficiency and wind direction for each group calculated according to the measurements of wind direction and efficiency of the wind turbine of each group.
Figure 4:
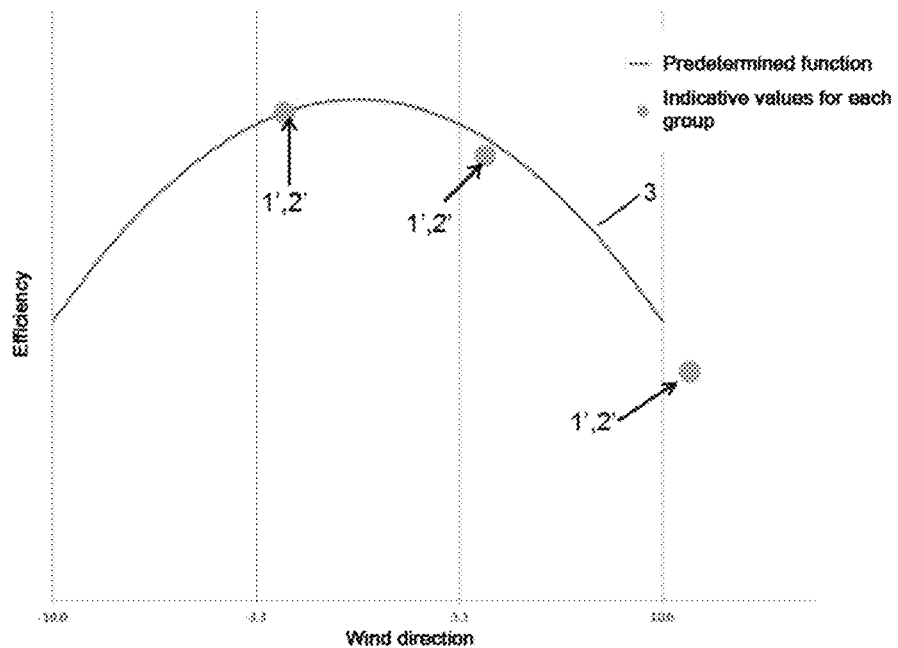
FIG. 4 shows the values indicative of the efficiency and wind direction for each group shown in FIG. 3 once the adjustment of the values indicative of direction and of the values indicative of the efficiency to the predetermined function has been made.

Additionally, the step of gathering the values indicative of wind direction (1) and the values indicative of efficiency (2) of the wind turbine can comprise a sub-step of classification of the measurements of wind direction with respect to the longitudinal direction of the nacelle in the at least two groups (4) according to the measurements of wind direction with respect to the longitudinal direction of the nacelle, wherein the values indicative of the wind direction (1) obtained in the step of obtaining the values indicative of wind direction (1) and efficiency (2) of the wind turbine are a value indicative of wind direction (1') for each group (4) obtained from the measurements of efficiency of the wind turbine of each group (4). This is observed in FIGS. 3 and 4.

Preferably, the values indicative of wind direction (1) and of efficiency (2) of the wind turbine of each group (4) are mean values calculated from the measurements of wind direction and from the measurements of efficiency of the wind turbine of each group (4).

Preferably, the values indicative of efficiency (2) of the wind turbine corresponding to each value indicative of wind direction (1) are obtained from values indicative of electric power generated by the wind turbine and from values indicative of wind speed or are a power coefficient ($C_p$).

In this case, the values indicative of efficiency (2) of the wind turbine above $v_{rated}$, wherein the electric power generated by the wind turbine is the rated power ($P_{rated}$), do not provide information and can distort the results.

The control method of the wind turbine, according to this example of embodiment, comprises a step of selection of the values indicative of efficiency (2) of the wind turbine corresponding to each value indicative of wind direction (1).

In this step of selection of the values indicative of efficiency (2) of the wind turbine, the values selected fulfil that:
  the wind turbine is operating for a period of time during which the corresponding values indicative of wind direction (1) are obtained, and
  the wind turbine does not perform any orientation operation for the period of time during which the corresponding values indicative of wind direction (1) are obtained, and additionally, fulfil that:

the mean value of a signal indicative of wind speed for a period of time during which the corresponding values indicative of wind direction are obtained, is within a predetermined range.

The predetermined range, in which the mean value of the signal indicative of wind speed is for the period of time during which the values indicative of wind direction are obtained, can be the following:

$$v_{Cut\_in} < v < v_{rated},$$

preferably, the following:

$$1.5 \times v_{Cut\_in} < v < 0.85 \times v_{rated}.$$

In this way, the step of selection of the values indicative of efficiency (2) of the wind turbine allows, on the one hand, to eliminate points close to the rated power ($P_{rated}$) which could be affected by the effect explained above and, on the other hand, to eliminate the points close to the cut-in speed $v_{Cut-in}$, which are very disperse and which can therefore distort the results.

Optionally, the step of calculation of the correction value of the orientation system is performed for predefined sectors of wind direction and/or for different ranges of wind speed, wind turbine power or rotor speed.

This is due to the fact that for each predefined sector of wind direction and/or range of wind speed (wind turbine power or rotor speed) there can be a different correction value, due to the fact that the distortion of flow induced by the rotor in the position of the wind vane depends, among other factors, on the speed of the wind. Therefore, the values indicative of wind direction (1) and efficiency (2) are also selected according to the sector of wind direction and/or the range of wind speed to perform the step of calculation of the correction value for each sector of wind direction or range of wind speed.

The invention also relates to a wind turbine which comprises:
  a nacelle that comprises a longitudinal direction,
  an orientation system,
  means for gathering:
    values indicative of wind direction (1) with respect to the longitudinal direction of the nacelle, and
    values indicative of efficiency (2) of the wind turbine corresponding to each value indicative of wind direction (1),
  means for calculating a correction value of the orientation system according to the values indicative of wind direction (1) and the values indicative of efficiency (2) of the wind turbine, and
  means for correcting the orientation of the nacelle according to the correction value of the orientation system,
  wherein the means for calculating the correction value of the orientation system comprise in turn:
    means for calculating fitting parameters to a predetermined function (3) of the values indicative of wind direction (1) and of the values indicative of efficiency (2) of the wind turbine, and
    wherein the means for calculating the correction value of the orientation system calculate the correction value of the orientation system according to at least one of the fitting parameters.

The fitting parameters to the predetermined function of the values indicative of wind direction (1) and of the values indicative of efficiency (2) of the wind turbine are an offset "a" applied to the values indicative of wind direction (1) and an offset "b" applied to the values indicative of efficiency (2) of the wind turbine which provide an adjustment to the predetermined function (3), wherein the means for calculating calculate the correction value of the orientation system according to the offset "a" of the wind direction signal.

The wind turbine comprises means of measurement of wind direction measurements with respect to the longitudinal direction of the nacelle and of efficiency measurements of the wind turbine corresponding to each measurement of wind direction respectively so as to obtain by means of the obtaining means, the values indicative of wind direction (1) and the values indicative of efficiency (2) of the wind turbine.

Optionally, the wind turbine comprises means of classification of the efficiency measurements of the wind turbine in at least two groups (4), according to the corresponding measurements of wind direction, wherein the values indicative of efficiency (2) of the wind turbine obtained by the means of gathering the values indicative of wind direction (1) and efficiency (2) of the wind turbine are a value indicative of efficiency (2') of the wind turbine for each group (4) obtained from the measurements of efficiency of the wind turbine of each group (4).

The means of classification can classify also the measurements of wind direction with respect to the longitudinal direction of the nacelle in the at least two groups (4) according to the measurements of wind direction with respect to the longitudinal direction of the nacelle, and wherein the values indicative of wind direction (1) obtained by the means for gathering the values indicative of wind direction (1) and efficiency (2) of the wind turbine are a value indicative of wind direction (1') for each group (4) obtained from the measurements of efficiency of the wind turbine of each group (4).

The wind turbine comprises means of selection of the values indicative of efficiency (2) of the wind turbine corresponding to each value indicative of wind direction (1), wherein the means of selection select the values indicative of efficiency (2) of the wind turbine when:
  the wind turbine is operating and does not perform any orientation operation for a period of time during which the corresponding values indicative of wind direction (1) are obtained, and/or
  the mean value of a signal indicative of wind speed for a period of time during which the corresponding values of wind direction (1) are obtained is within a predetermined range.

The calculation means calculate the correction value of the orientation system for predefined wind direction sectors.

Example 1

Figure 5:
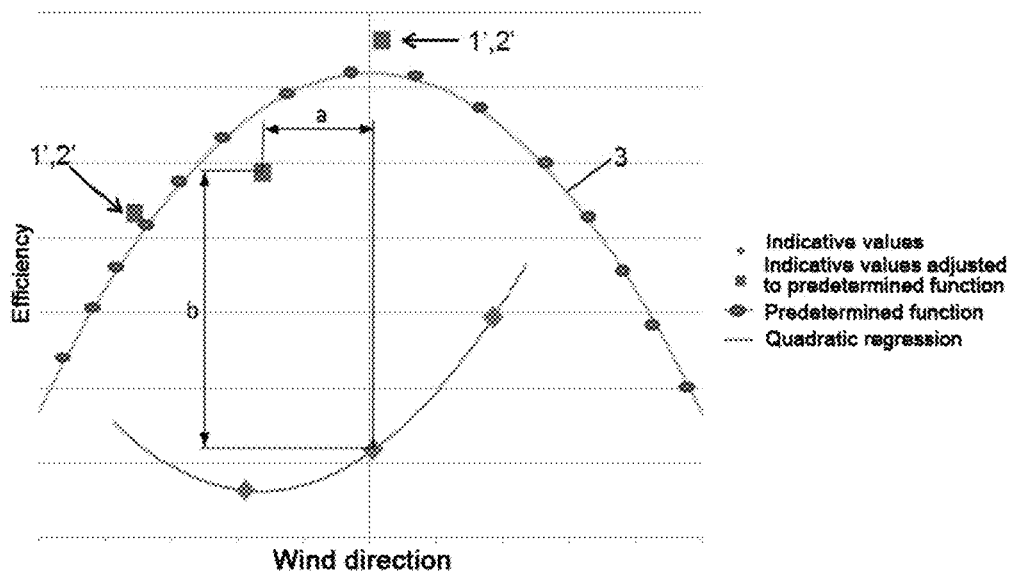
FIG. 5 shows the comparison between the method of the present invention (predetermined function) for the values indicative of the efficiency and wind direction for each group, and a method that approximates the points by least squares fit to a quadratic function (quadratic regression) for values with the same arrangement, wherein the quadratic function or parabola does not have a maximum.

FIG. 5 shows the comparison between the method of the present invention (predetermined function) for the values indicative of efficiency and wind direction for each group, and a method that approximates the points by least squares fit to a quadratic function (quadratic regression) for values with the same arrangement, wherein the quadratic function or parabola has no maximum, meaning that the step of estimation of the method that approximates the points by least squares fit to the quadratic function has an error value as a result, whereas the method of the present invention always obtains a correction value, with this method being moreover more robust.

Example 2

Figure 6:
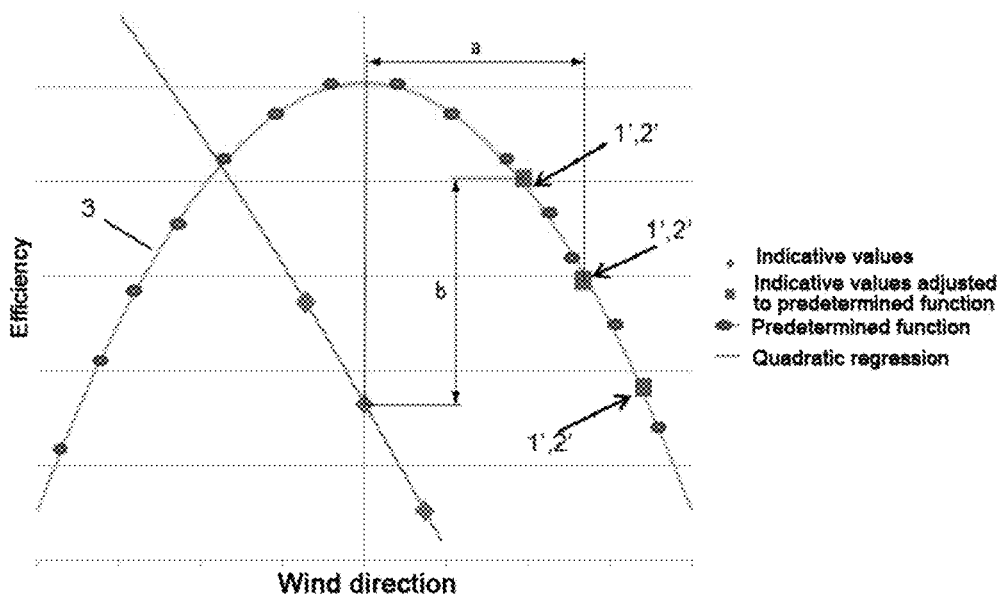
FIG. 6 shows the comparison between the method of the present invention (predetermined function) for the values indicative of the efficiency and wind direction for each group, and a method that approximates the points by least squares fit to a quadratic function (quadratic regression) for values with the same arrangement, wherein the quadratic function or parabola does have a maximum.

FIG. 6 shows the comparison between the method of the present invention (predetermined function) for the values indicative of efficiency and wind direction for each group, and a method that approximates the points by least squares fit to a quadratic function (quadratic regression) for values with the same arrangement, wherein the quadratic function or parabola does have a maximum, but it is very far away from the real wind direction, meaning that the correction value would be very high, close to 90°, which is very probably not the correct correction value, whereas the method of the present invention obtains a correction value of 13°, which although high, continues to be coherent.

The invention claimed is:

1. Wind turbine control method, wherein the wind turbine comprises:
    a nacelle that comprises a longitudinal direction, and
    an orientation system,
wherein the method comprises the following steps:
    a step of gathering:
        values indicative of wind direction with respect to the longitudinal direction of the nacelle, and
        values indicative of efficiency of the wind turbine corresponding to each value indicative of wind direction,
    a step of calculation of a correction value of the orientation system according to the values indicative of wind direction and the values indicative of efficiency of the wind turbine, and
    a step of correction of the orientation of the nacelle according to the correction value of the orientation system, and
wherein the step of calculation of the correction value of the orientation system comprises in turn the following sub-steps:
    a sub-step of calculation of fitting parameters to a predetermined function, for the adjustment of the values indicative of wind direction and of the values indicative of efficiency of the wind turbine to the predetermined function, and
    a sub-step of calculation of the correction value of the orientation system according to at least one of the fitting parameters calculated in the preceding sub-step.

2. The method of claim 1 wherein the predetermined function is a function that relates the efficiency of the wind turbine to the wind direction with respect to the longitudinal direction of the nacelle.

3. The method of claim 1 wherein the fitting parameters to the predetermined function of the values indicative of wind direction and of the values indicative of efficiency of the wind turbine of the sub-step of calculation of the fitting parameters are an offset "a" applied to the values indicative of wind direction and an offset "b" applied to the values indicative of efficiency of the wind turbine which provide an adjustment to the predetermined function, and wherein the sub-step of calculation of the correction value of the orientation system according to at least one of the fitting parameters calculates the correction value of the orientation system according to the offset "a" applied to the values indicative of wind direction.

4. The method of claim 1 wherein the values indicative of wind direction and the values indicative of efficiency of the wind turbine are obtained, respectively, from measurements of wind direction with respect to the longitudinal direction of the nacelle and from measurements of efficiency of the wind turbine corresponding to each measurement of wind direction.

5. The method of claim 4 wherein the step of gathering the values indicative of wind direction and the values indicative of efficiency of the wind turbine comprises additionally:
    a sub-step of classification of the measurements of efficiency of the wind turbine in at least two groups, according to the corresponding measurements of wind direction, and
    wherein the values indicative of efficiency of the wind turbine obtained in the step of gathering the values indicative of wind direction and efficiency of the wind turbine are a value indicative of efficiency of the wind turbine for each group obtained from the measurements of efficiency of the wind turbine of each group.

6. The method of claim 5 wherein the step of gathering the values indicative of the wind direction and the values indicative of efficiency of the wind turbine additionally comprises:
    a sub-step of classification of the measurements of wind direction with respect to the longitudinal direction of the nacelle in the at least two groups according to the measurements of wind direction with respect to the longitudinal direction of the nacelle, and
    wherein the values indicative of wind direction obtained in the step of gathering the values indicative of wind direction and efficiency of the wind turbine are a value indicative of wind direction for each group obtained from the measurements of efficiency of the wind turbine of each group.

7. The method of claim 6 wherein the values indicative of wind direction and of efficiency of the wind turbine of each group are mean values calculated on the basis of the measurements of wind direction and the measurements of efficiency of the wind turbine of each group.

8. The method of claim 5 wherein the at least two groups of the sub-step of classification of the measurements of efficiency of the wind turbine are three groups.

9. The method of claim 1 wherein the step of correction of the orientation of the nacelle is performed once the correction value of the orientation system is above a first threshold.

10. The method of claim 1 wherein the values indicative of efficiency of the wind turbine corresponding to each value indicative of wind direction are obtained from values indicative of electric power generated by the wind turbine and from values indicative of wind speed.

11. The method of claim 1 wherein the values indicative of the efficiency of the wind turbine corresponding to each value indicative of wind direction are a power coefficient.

12. The method of claim 1 further comprising a step of selection of the values indicative of efficiency of the wind turbine corresponding to each value indicative of wind direction, wherein in the step of selection of the values indicative of efficiency of the wind turbine the selected values fulfil that:
    the wind turbine is operating for a period of time during which the corresponding values indicative of wind direction are obtained, and
    the wind turbine does not perform any orientation operation for the period of time during which the corresponding values indicative of wind direction are obtained.

13. The method of claim 1 further comprising a step of selection of the values indicative of efficiency of the wind turbine corresponding to each value indicative of wind direction, wherein in the step of selection of the values indicative of efficiency of the wind turbine the selected values fulfil that:
    the mean value of a signal indicative of wind speed for a period of time during which the corresponding values indicative of wind direction are obtained, is within a predetermined range.

14. The method of claim 1 wherein the step of calculation of the correction value of the orientation system is performed for predefined sectors of wind direction.

15. The method of claim 1 wherein the step of calculation of the correction value of the orientation system is performed for different ranges of wind speeds, wind turbine power or rotor speed.

16. The method of claim 1 wherein during the step of gathering the values indicative of wind direction and of the values indicative of efficiency of the wind turbine, the control system of the wind turbine allows a range of misalignment of the longitudinal direction of the nacelle with respect to the wind direction that is greater than a range of misalignment allowed outside of the step of gathering of the values indicative of wind direction and of efficiency of the wind turbine.

17. Wind turbine which comprises:
a nacelle that comprises a longitudinal direction,
an orientation system,
a wind direction indicator configured to gather:
values indicative of wind direction with respect to the longitudinal direction of the nacelle,
a wind efficiency indicator configured to gather:
values indicative of efficiency of the wind turbine corresponding to each value indicative of wind direction,
a processor configured to calculate a correction value of the orientation system according to the values indicative of wind direction and to the values indicative of efficiency of the wind turbine,
wherein the orientation system is configured to correct the orientation of the nacelle according to the correction value, and wherein the processor is also configured to calculate
fitting parameters to a predetermined function of the values indicative of wind direction and of the values indicative of efficiency of the wind turbine, and to calculate the correction value of the orientation system according to at least one of the fitting parameters.

18. The wind turbine of claim 17 wherein the predetermined function is a function that relates the efficiency loss of the wind turbine to the wind direction with respect to the longitudinal direction of the nacelle.

19. The wind turbine of claim 17 wherein the fitting parameters to the predetermined function of the values indicative of wind direction and of the values indicative of efficiency of the wind turbine are an offset "a" applied to the values indicative of wind direction and an offset "b" applied to the values indicative of efficiency of the wind turbine which provide an adjustment to the predetermined function, and wherein the processor is also configured to calculate the correction value of the orientation system according to the offset "a" of the wind direction signal.

20. The wind turbine of claim 17 further comprising a meter configured to measure wind direction measurements with respect to the longitudinal direction of the nacelle and of efficiency measurements of the wind turbine corresponding to each measurement of the wind direction respectively for the obtainment through the wind direction indicator and the wind efficiency indicator, of the values indicative of wind direction and of the values indicative of efficiency of the wind turbine, respectively.

21. The wind turbine of claim 20 wherein the processor is also configured to classify the efficiency measurements of the wind turbine in at least two groups, according to the corresponding measurements of wind direction, wherein the values indicative of efficiency of the wind turbine obtained by the wind direction indicator and the wind efficiency indicator are a value indicative of efficiency of the wind turbine for each group obtained from the measurement of efficiency of the wind turbine of each group.

22. The wind turbine of claim 21 wherein the processor is also configured to classify the measurements of wind direction with respect to the longitudinal direction of the nacelle in the at least two groups according to the measurements of wind direction with respect to the longitudinal direction of the nacelle, and wherein the values indicative of wind direction obtained by the wind direction indicator and the wind efficiency indicator are a value indicative of wind direction for each group obtained from the measurements of efficiency of the wind turbine of each group.

23. The wind turbine of claim 17 wherein the processor is also configured to select the values indicative of efficiency of the wind turbine corresponding to each value indicative of wind direction, wherein the processor is configured to select the values indicative of efficiency of the wind turbine when:
the wind turbine is operating and does not perform any orientation operation for a period of time during which the corresponding values indicative of wind direction are obtained, and/or
the mean value of a signal indicative of the speed of the wind for a period of time during which the corresponding values indicative of the wind direction are obtained are within a predetermined range.

24. The wind turbine of claim 17 wherein the processor is also configured to calculate the correction value of the orientation system for some predefined wind direction sectors.

* * * * *